H. H. TAYLOR.
ELECTRIC GENERATOR ATTACHMENT FOR WINDMILLS.
APPLICATION FILED AUG. 5, 1919.
1,351,975.
Patented Sept. 7, 1920.
2 SHEETS—SHEET 1.
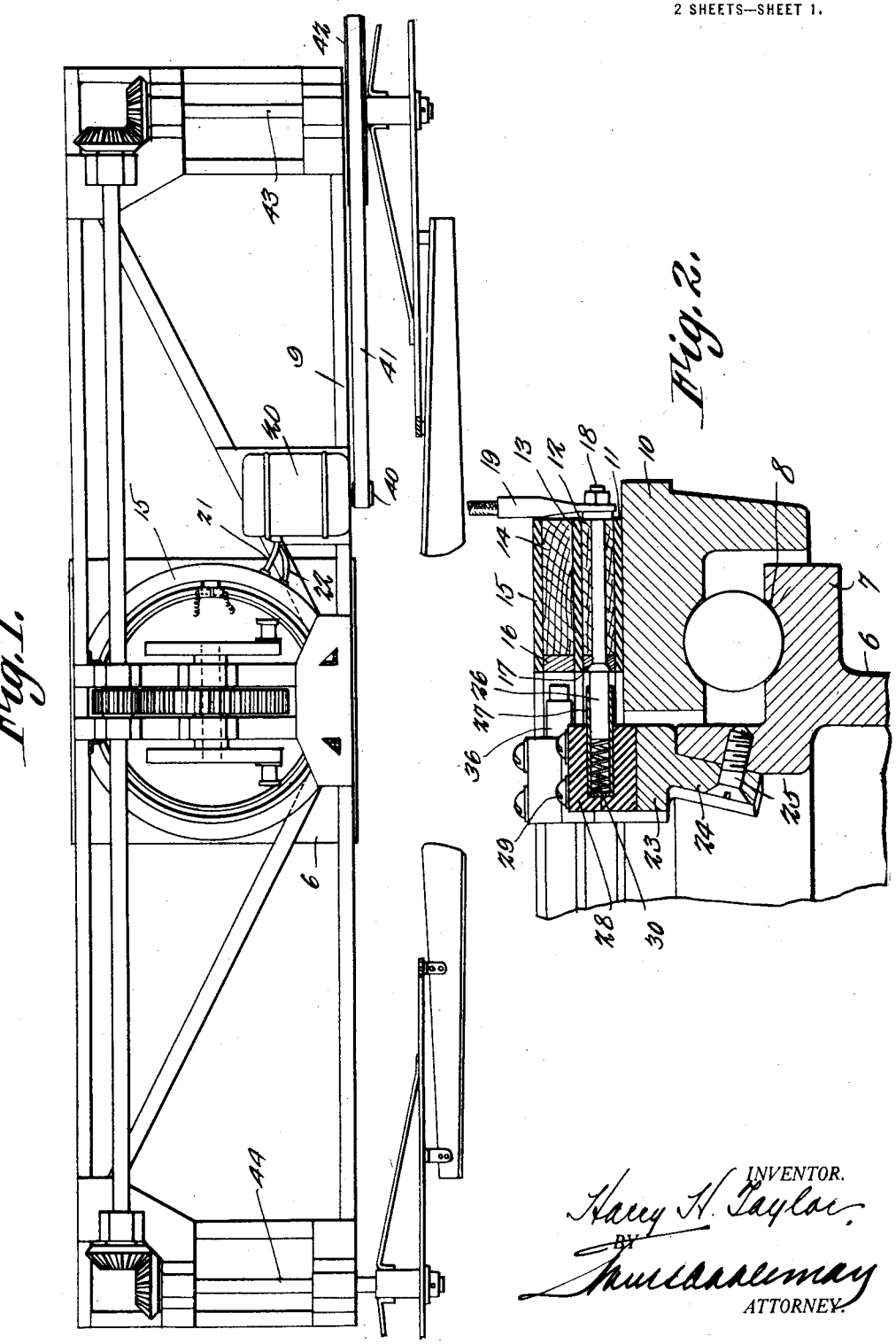
INVENTOR.
Harry H. Taylor,
BY
ATTORNEY.

H. H. TAYLOR.
ELECTRIC GENERATOR ATTACHMENT FOR WINDMILLS.
APPLICATION FILED AUG. 5, 1919.
1,351,975.
Patented Sept. 7, 1920.
2 SHEETS—SHEET 2.
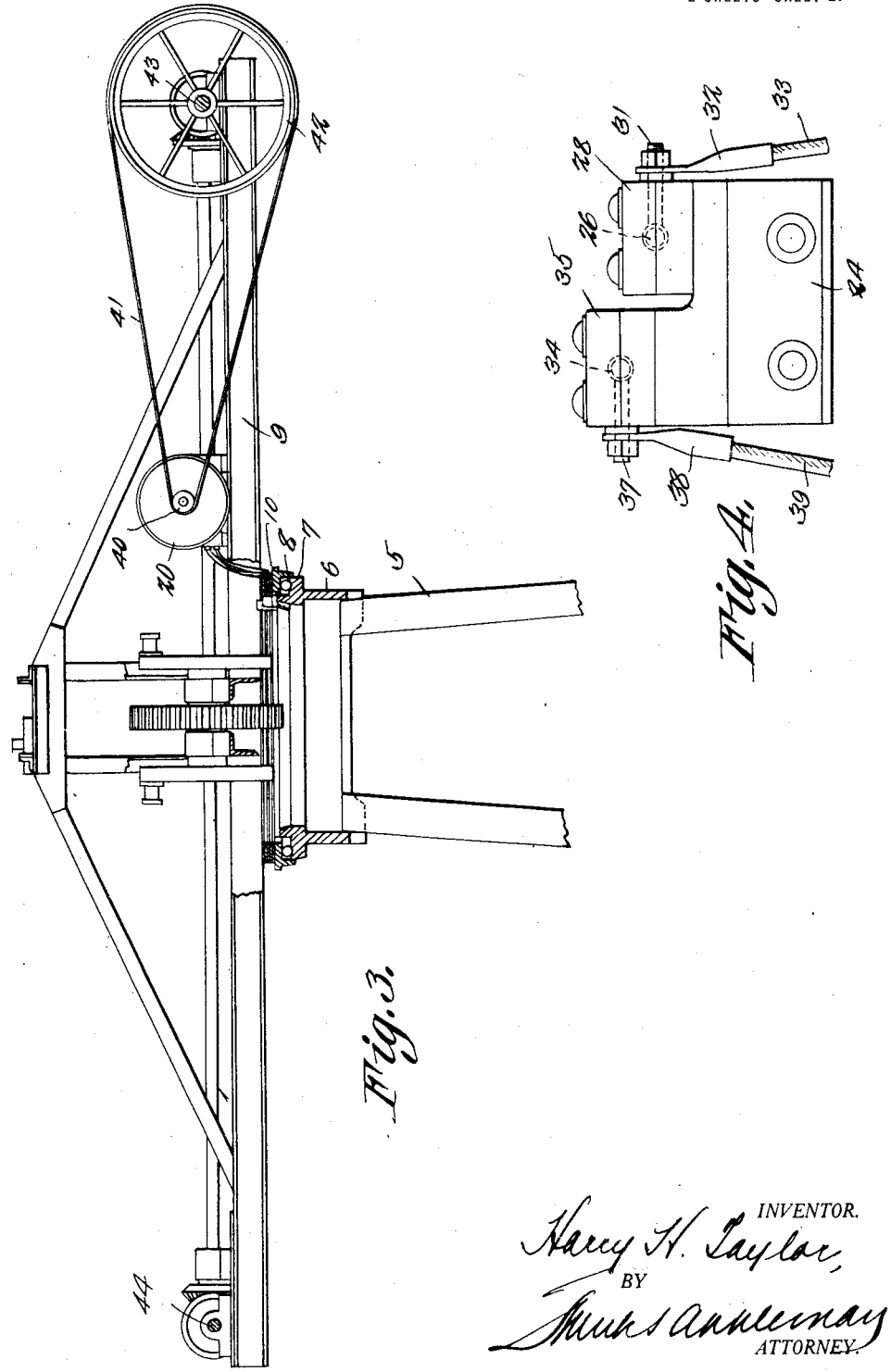

UNITED STATES PATENT OFFICE.

HARRY H. TAYLOR, OF HUTCHINSON, KANSAS.

ELECTRIC-GENERATOR ATTACHMENT FOR WINDMILLS.

1,351,975.   Specification of Letters Patent.   Patented Sept. 7, 1920.

Application filed August 5, 1919. Serial No. 315,525.

*To all whom it may concern:*

Be it known that I, HARRY H. TAYLOR, a citizen of the United States of America, and resident of Hutchinson, in the county of Reno and State of Kansas, have invented certain new and useful Improvements in Electric-Generator Attachments for Windmills, of which the following is a specification.

This invention relates to windmills, and particularly to electric generators associated therewith for utilizing the power of the windmill to produce electricity, and said invention is applicable more particularly to windmills of the twin-well type.

An object of this invention is to produce novel means whereby the power parties of the windmill may rotate with respect to the derrick or support without affecting the electrical communication between the generator and the storage tank or the conductors for delivering the electricity to localities where it may be used.

A further object of this invention is to provide novel means whereby the slip rings are carried by the windmill frame and in operative relation to stationary brushes situated on the head of the derrick, or on what is usually termed the housing, with relation to which the frame rotates.

A further object of this invention is to produce a device of this character which will not be seriously affected by moisture.

With the foregoing and other objects in view, the invention consists in the details of construction and in the arrangement and combination of parts to be hereinafter more fully set forth and claimed.

In describing the invention in detail reference will be had to the accompanying drawings forming part of this specification wherein like characters denote corresponding parts in the several views and in which—

Figure 1 illustrates a plan view of a windmill with a device embodying the invention applied thereto.

Fig. 2 illustrates enlarged detail sectional view of the slip rings, brush, and the mounting for the power plant of the windmill.

Fig. 3 illustrates view and elevation partly in section of the top of the derrick and the power mechanism mounted thereon.

Fig. 4 is a view and elevation of the terminals of the storage batteries and their mounting.

In these drawings 5 denotes a derrick or support having a head 6, having the usual housing 7 for the ball-race 8, and the balls in the said ball-race supporting the frame 9 of the power plant so that the said frame may turn under the influence of the wind as is ordinary in devices of this class.

The ring 10 of the ball-race constitutes a support for the contact rings, which comprises a series of annular members superposed preferably in the order as follows: A hard fiber ring 11 is supported by the member 10, a wooden ring 12 is placed thereon which in turn supports a hard fiber ring 13. Another wooden ring 14, and a top fibrous ring 15 complete the elements of the contact rings commutator, except the contact rings 16 and 17, each of which lies against an edge of a wooden filler ring between two of the fiber rings.

Terminal bolts 18 extend through a contact ring and one of the wooden filler rings, and a conductor terminal 19 is attached to a bolt, it being understood that a bolt is provided for each of the slip rings and they are connected to the poles of a generator 20, which generator may be of any ordinary type and used on the frame 9. Conductors 21 and 22 connect the bolts and the generator.

Brush holders are attached to the member 7, and the said brush holders comprise a body portion 23 having a downwardly extending flange 24 which is attached to the member 7 by fastenings such as screws 25. The brushes must be held in different planes in order that one of them will coact with the contact ring 16 and the other with the contact ring 17. To that end the body is stepped, as shown in Fig. 4, and the brush 26 is slidable in a tube 27 held on the body by a clamp 28, the said clamp being anchored by secure devices such as screws 29. As stated, the brush 26 is slidable in the tube and it is urged outwardly by a spring 30 seated in the tube and bearing against the inner end of the said brush. A terminal post 31 is electrically connected to the tube and the terminal 32 and the conductor 33 will be connected to one of the terminals or poles of the storage battery.

The brush 34 is held on a higher plane by the clamp 35, which engages the tube 36 in which the brush is slidable. The terminal post 37 conducts electricity from the tube to the terminal 38, to which the conductor 39 is connected, and the conductor 39 may lead to the other pole or terminal post of the battery.

By reason of the arrangement of parts just described, it will be apparent that the frame carrying the generator may rotate with relation to the stationary brushes without interrupting the operation of the generator, which may supply current for storage or consumption regardless of its position with relation to the brushes.

It is perhaps unnecessary for an understanding by one skilled in the art, to describe the windmill construction, but the generator 20 is provided with a pulley 40 connected by a belt 41 with a pulley 42 on the wheel shaft 43, and the said wheel shaft 43 is geared to the wheel shaft 44, as fully shown in Fig. 1, and the foregoing will suffice for a disclosure of a twin-wheel windmill coupled to operate or drive the generator.

I claim—

In a generator attachment for windmills, a support having a head, a brush holder comprising a circular body portion having an upper surface arranged in stepped formation, a depending lug secured to the head, said body portion having lateral openings formed therein, spring pressed brush members positioned in the openings, rotary contact rings coöperating with the brushes for conducting electricity, and means for revolving the rings.

HARRY H. TAYLOR.